April 4, 1939.　　F. SCHANZER　　2,153,028
BEARING
Filed Dec. 11, 1937　　2 Sheets-Sheet 1

*Inventor:*
FELIX SCHANZER
By: Richards & Geier
*Attorneys*

April 4, 1939.　　　F. SCHANZER　　　2,153,028
BEARING
Filed Dec. 11, 1937　　　2 Sheets-Sheet 2
Fig. 5.
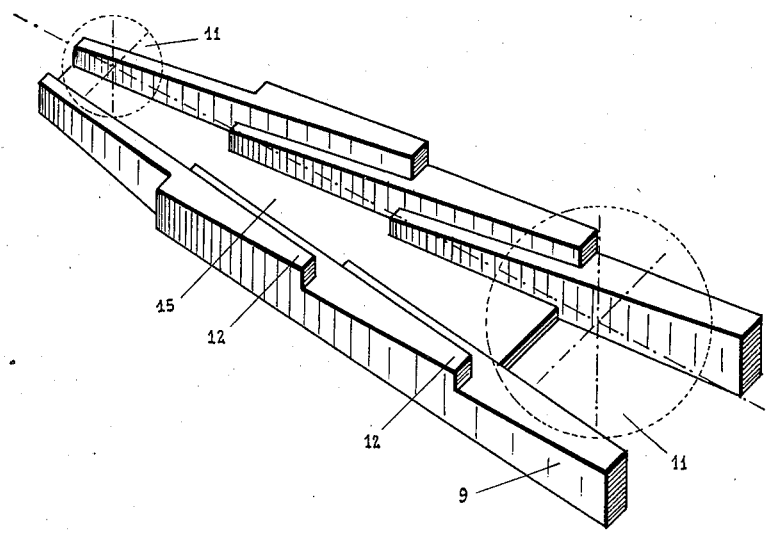
Fig. 6.　　　Fig. 6.ᴬ　　　Fig. 6ᴮ.
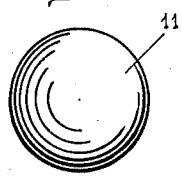 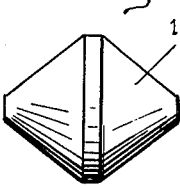 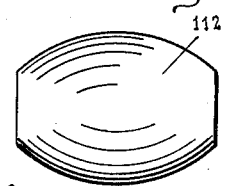
Fig. 7.　　　Fig. 8.
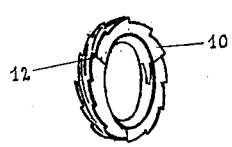 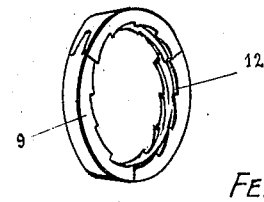
Inventor:
FELIX SCHANZER
By: Richards & Geier
Attorneys Patented Apr. 4, 1939

2,153,028

UNITED STATES PATENT OFFICE 2,153,028

BEARING

Felix Schanzer, Berlin, Germany

Application December 11, 1937, Serial No. 179,233
In Germany December 21, 1936

3 Claims. (Cl. 308—196)

This invention relates to bearings, and refers more particularly to divided ball-bearings, roller-bearings, and the like.

In prior art, several attempts were made to use roller-bearings or ball-bearings the rings of which were made of several portions; the contacting surfaces of these portions extending in a direction transverse to the direction of movement of the rollers or balls. While such divided bearings are very advantageous for manufacturing and assembly purposes, they have the disadvantage that the rollers or balls of the bearings come in contact with the joints interconnecting the separate ring portions. The forces continually transmitted by the balls or rollers to the contacting ring portions gradually cause the formation of a space between them and result finally in irreparable damage to the bearing. Due to this drawback, each supporting ring of ball-bearings, roller-bearings, and the like is now made of one piece, even though such construction is often very inconvenient.

An object of the present invention is the provision of a bearing, the balls, rollers, or other rotary elements of which are carried by supports consisting of separate pieces, said supports being so arranged that the rotary elements do not contact the interengaging portions of these pieces, so that this bearing will have all the advantages of a divided bearing without having the disadvantages thereof.

Another object is the provision of a ball bearing, roller bearing, or the like, the rings of which consist of several pieces, said bearing being so constructed that the rotary elements thereof will not have any detrimental effect upon the contacting portions of said several pieces.

Other objects are obvious, or will be apparent in the course of the following description.

The objects of the present invention may be realized through the provision of a bearing, the supporting rings of which comprise inter-engaging pairs of ribs or supports which carry the rotary elements of the bearing and which diverge in relation to the direction of movement of the rotary elements. Furthermore, these ribs or supports are upwardly inclined in relation to the direction of this movement, so that the rotary elements roll upon them in a manner which is similar to the movements of an upwardly rolling ball. The inclined and diverging ribs are so arranged that before the rotary element reaches the end of one pair of ribs, two points upon the outer surface of this element, which are situated lower than the point of contact of said element with said pair, engage another pair of ribs. The contacting surfaces between the various pieces of the supporting rings extend in broken lines transversely to the direction of movement of the rotary elements, so that the rotary elements are at no time in contact with the contacting portions or joints of these separate pieces.

The invention will appear more clearly from the following detailed description when taken in connection with the accompanying drawings, showing by way of example preferred embodiments of the inventive idea.

In the drawings:

Figure 5 is similar to Figure 3 and shows the supporting surface in perspective, said surface being shown for the sake of clarity as extending along a flat surface instead of a cylindrical one;

Figure 6 shows three different rotary elements;

Figure 7 is a perspective view showing the outer cylindrical surface of the inner ring of the ball bearing; and Figure 8 is a perspective view showing the inner cylindrical surface of the outer ring of the ball bearing.

Figure 1:
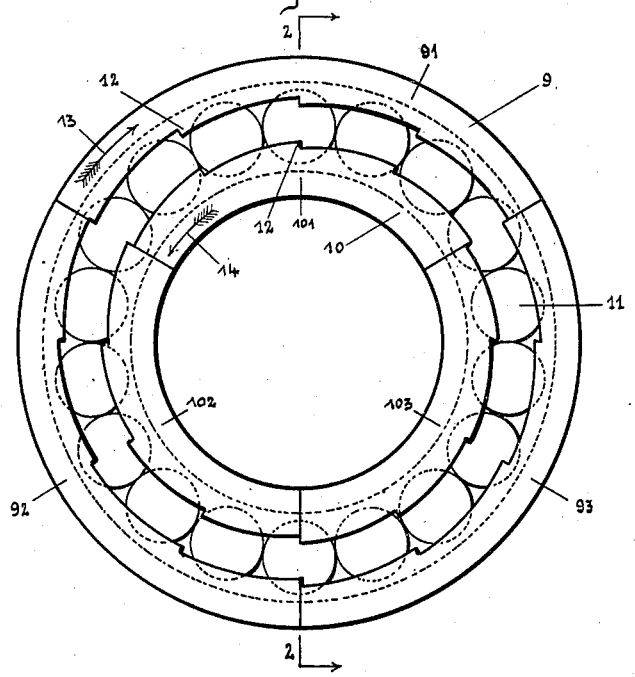
Figure 1 shows in side elevation a roller bearing constructed in accordance with the principles of the present invention.

The bearing shown in the drawing comprises an outer ring 9 and an inner ring 10, as well as rotary elements such as balls 11 situated between these rings. In accordance with the present invention, the inner surfaces of the outer ring 9 and the outer cylindrical surfaces of the inner ring 10 are provided with guides or ribs 12.

These ribs form inter-engaging pairs which diverge in relation to each other and to the circumferential axis of the rings. The rib of each pair constitutes the continuation of a rib of another pair and has an end which is situated intermediate the ends of that rib. However, the ribs 12 diverge in such manner that the centers of the rotary bodies 11 always lie upon the same radius. Furthermore, the ribs 12 of the ring 10 diverge in the opposite direction to the direction of the ribs 12 upon the ring 9, as indicated by the arrows 13 and 14 in Figure 1. The ribs 12 are slightly inclined in relation to the axis of movement of the rotary body 11, so that the movement of the rotary body along the ribs is similar to that of a ball rolling upon an upwardly inclined surface.

Due to the fact that the ribs 12 upon opposed guiding surfaces extend in different directions, the balls or the rotary elements 11 can move more freely between these rings in both directions, i. e. in the directions of the two arrows 13 and 14.

As shown more clearly in Figure 1, the inner ring 10 consists of three separate pieces 101, 102, and 103, while the outer ring 9 comprises three different pieces 91, 92, and 93. Obviously, the rings 9 or 10 may consist of any suitable number of separate parts or pieces, and the contacting surfaces of two adjacent pieces may be arranged upon any pair of ribs.

Figure 2:
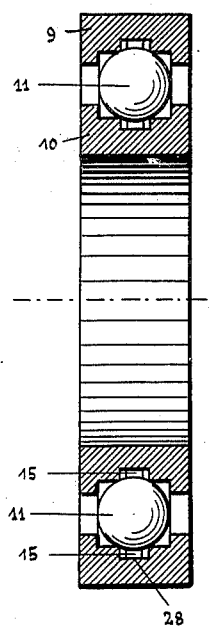
Figure 2 is a section through the roller bearing along the line 2—2 of Figure 1.

As shown more clearly in Figure 2 of the drawings, channels or grooves 15 within which the rotary bodies 11 are situated, are formed between the guides or ribs 12. The rotary bodies extend between the ribs 12 and cannot fall out sidewise, so that the bearing can be used without a cage or other means generally used in the art for maintaining the balls within the ball bearing. The channels 15 formed between the ribs 12 have the further advantage that they prevent the dirtying of the surfaces along which the rotary elements 11 are moved. Furthermore, these channels prevent a deterioration of the running surfaces, caused by weather conditions.

Figure 3:
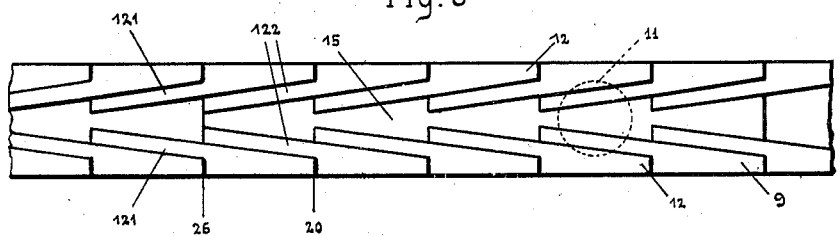
Figure 3 is a diagram illustrating the development of the outer supporting surface of the roller bearing, as seen from the inside of the ring comprising such surface.
Figure 4:
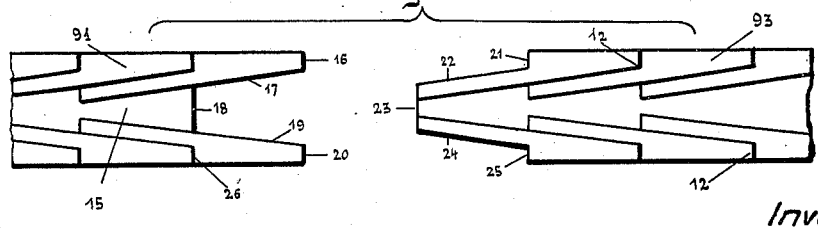
Figure 4 is similar to Figure 3 and shows diagrammatically two separate pieces of a supporting ring.

Figures 3 and 4 which illustrate diagrammatically upon a plane a part of the surfaces of the outer ring 9 upon which the rotary elements 11 are moved show a part of the ring portion 9 and an adjacent part of the ring portion 93. The end surfaces 16, 17, 18, 19 and 20 of the ring portion 91 contact the surfaces 21, 22, 23, 24, and 25, respectively, of the ring portion 93. These contacting surfaces extend, therefore, in broken lines transversely to the axis of movement of the rotary body 1 and between the pairs of ribs 12.

It is apparent that the rotary bodies 11 moving from the ring element 91 to the ring element 93 will not touch any of these contacting surfaces, since a rotary body 11 rolling upon the ribs 121 (Fig. 3) will move from them to the adjacent pair of ribs 122 while passing through that portion of the ring 9 which extends from the end surface 26 to the end surface 20; the rotary body 11 will contact the ribs 122 before leaving the ribs 121, the point of contact at the body 11 with the ribs 122 being lower than its point of contact with the ribs 121.

While Figures 3 to 5 show for simplicity's sake the ribs 12 as extending along a flat surface, actually these ribs extend along a cylindrical surface, as is apparent from Figures 7 and 8 of the drawings. Obviously, the path of movement of the center of each rotary body 11 is parallel to the bottom surface 28 of the grooves 15. The points of contact of the rotary bodies 11 with the ribs 12 change continually, so that the rotary bodies roll along conical lines.

Figure 6 illustrates rotary bodies 111 and 112, which may be used in lieu of the balls 11.

The described ball bearings may be used for any purpose and may be subjected to longitudinal pressure as well as to transverse pressure. If the bearing is to be subjected primarily to axial pressure, the groove 15 may be made wider, so that the rotary bodies 11 will be located more deeply within that groove. On the other hand, if the bearing is to be subjected primarily to transverse pressure, the groove 15 should be made more narrow.

The described bearings may be inserted into machines by various means, for instance, they may be placed into casings, sleeves, or the like.

In certain instances the inner divided ring 10 may be eliminated and substituted by a one-piece ring or the balls 11 may be caused to roll upon the smooth surface of a shaft or the like. Furthermore, several inner and outer rings with diverging guiding ribs may be arranged one next to the other. In general, the described structures are subject to wide variation and modification without departing from the scope or intent of the invention, all of which variations and modifications are to be included within the scope of the present invention.

What is claimed is:

1. A supporting surface for a rolling rotary body, said supporting surface consisting of at least two inter-engaging parts and comprising at least two pairs of ribs engaging said rotary body, a groove being formed between said ribs, the rib of each pair constituting the continuation of a rib of another pair and having an end which is situated intermediate the ends of the last-mentioned rib, said pairs of ribs diverging and being upwardly inclined in relation to the axis of movement of the rolling rotary body, whereby the rotary body moves upon said ribs in a manner similar to the rolling of a sphere upon an upwardly inclined surface, and whereby the rotary body before leaving one pair of ribs is in engagement with another pair of ribs at points of contact which are lower than the points of contact of the rotary body with the first-mentioned pair of ribs, the contacting surfaces of said two parts extending in broken lines transversely to said axis of movement and between said pairs of ribs.

2. A bearing for a rotary body, said bearing comprising an outer divided ring having an inner supporting surface as described in claim 1.

3. A bearing for a rotary body, said bearing comprising an outer divided ring having an inner supporting surface as described in claim 1, and an inner divided ring having an outer supporting surface as described in claim 1, the rotary body being situated between said supporting surfaces, the pairs of ribs of said supporting surfaces diverging and being inclined in opposite directions.

FELIX SCHANZER.